US012240672B2

(12) United States Patent
McKeown et al.

(10) Patent No.: US 12,240,672 B2
(45) Date of Patent: Mar. 4, 2025

(54) PACKAGING MATERIAL

(71) Applicant: Graphic Packaging International, LLC, Atlanta, GA (US)

(72) Inventors: Murat Sean McKeown, Broomfield, CO (US); William Gilpatrick, Broomfield, CO (US); Jeffrey T. Sloat, Broomfield, CO (US); Phillip Kenzlo, Loveland, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/078,124

(22) Filed: Dec. 9, 2022

(65) Prior Publication Data

US 2023/0182980 A1    Jun. 15, 2023

Related U.S. Application Data

(60) Provisional application No. 63/288,218, filed on Dec. 10, 2021.

(51) Int. Cl.
*B65D 65/40* (2006.01)
*B32B 27/10* (2006.01)
(Continued)

(52) U.S. Cl.
CPC .............. *B65D 65/40* (2013.01); *B32B 27/10* (2013.01); *B32B 27/18* (2013.01); *B32B 27/36* (2013.01);
(Continued)

(58) Field of Classification Search
CPC ...... B65D 65/40; B65D 65/466; B32B 27/10; B32B 27/18; B32B 27/36; B32B 2250/02; B32B 2264/108; B32B 2264/201; B32B 2307/7163; B32B 2307/7242; B32B 2553/00; B32B 7/12; B32B 27/08; B32B 27/306; B32B 27/32; B32B 27/34; B32B 29/002; B32B 29/005
See application file for complete search history.

(56) References Cited

U.S. PATENT DOCUMENTS 3,865,301 A    2/1975  Pothier et al.
4,398,994 A    8/1983  Beckett
(Continued)

FOREIGN PATENT DOCUMENTS

CA    2196154    7/1998
EP    0 382 399    8/1990
(Continued)

OTHER PUBLICATIONS

Mypati, S., Sellathurai, A., Kontopoulou, M., Docoslis, A., & Barz, D. P. (2020). High Concentration Graphene Nanoplatelet Dispersions in Water Stabilized by Graphene Oxide. *Carbon*.
(Continued)

*Primary Examiner* — James C Yager
(74) *Attorney, Agent, or Firm* — Womble Bond Dickinson (US) LLP

(57) ABSTRACT

A packaging material comprising a substrate and a liner extending along the substrate. The liner comprises at least a biopolymer and graphene nanoplatelets to provide a gas barrier along at least a portion of the packaging material.

14 Claims, 1 Drawing Sheet

(51) Int. Cl.
  *B32B 27/18*  (2006.01)
  *B32B 27/36*  (2006.01)
  *B65D 65/46*  (2006.01)
(52) U.S. Cl.
  CPC ........ *B65D 65/466* (2013.01); *B32B 2250/02* (2013.01); *B32B 2264/108* (2013.01); *B32B 2264/201* (2020.08); *B32B 2307/7163* (2013.01); *B32B 2307/7242* (2013.01); *B32B 2553/00* (2013.01)

(56) References Cited

U.S. PATENT DOCUMENTS

| | | |
|---|---|---|
| 4,552,614 A | 11/1985 | Beckett |
| 4,656,325 A | 4/1987 | Keefer |
| 4,703,148 A | 10/1987 | Mikulski |
| 4,775,771 A | 10/1988 | Pawlowski |
| 4,794,005 A | 12/1988 | Swiontek |
| 4,865,921 A | 9/1989 | Hollenberg |
| 4,890,439 A | 1/1990 | Smart |
| 4,927,991 A | 5/1990 | Wendt et al. |
| 4,936,935 A | 6/1990 | Beckett |
| 4,963,424 A | 10/1990 | Beckett |
| 4,972,059 A | 11/1990 | Wendt et al. |
| 5,026,958 A | 6/1991 | Palacios |
| 5,039,364 A | 8/1991 | Beckett |
| 5,117,078 A | 5/1992 | Beckett |
| 5,213,902 A | 5/1993 | Beckett |
| 5,217,768 A | 6/1993 | Walters et al. |
| 5,221,419 A | 6/1993 | Beckett |
| 5,260,537 A | 11/1993 | Beckett |
| 5,266,386 A | 11/1993 | Beckett |
| 5,310,976 A | 5/1994 | Beckett |
| 5,310,977 A | 5/1994 | Stenkamp et al. |
| 5,317,118 A | 5/1994 | Brandberg et al. |
| RE34,683 E | 8/1994 | Maynard |
| 5,340,436 A | 8/1994 | Beckett |
| 5,350,904 A | 9/1994 | Kemske et al. |
| 5,354,973 A | 10/1994 | Beckett |
| 5,370,883 A | 12/1994 | Saunier |
| 5,410,135 A | 4/1995 | Pollart |
| 5,424,517 A | 6/1995 | Habeger |
| 5,446,270 A | 8/1995 | Chamberlain et al. |
| 5,519,195 A | 5/1996 | Keefer |
| 5,530,231 A | 6/1996 | Walters et al. |
| 5,585,027 A | 12/1996 | Young |
| 5,593,610 A | 1/1997 | Minerich et al. |
| 5,628,921 A | 5/1997 | Beckett |
| 5,672,407 A | 9/1997 | Beckett |
| 5,698,127 A | 12/1997 | Lai et al. |
| 5,759,422 A | 6/1998 | Schmelzer |
| 5,800,724 A | 9/1998 | Habeger |
| 5,928,555 A | 7/1999 | Kim et al. |
| 6,049,072 A | 4/2000 | Olson et al. |
| 6,102,281 A | 8/2000 | Lafferty et al. |
| 6,114,679 A | 9/2000 | Lai et al. |
| 6,150,646 A | 11/2000 | Lai et al. |
| 6,150,647 A | 11/2000 | Anderson et al. |
| 6,204,492 B1 | 3/2001 | Zeng et al. |
| 6,251,451 B1 | 6/2001 | Zeng |
| 6,414,290 B1 | 7/2002 | Cole |
| 6,433,322 B2 | 8/2002 | Zeng et al. |
| 6,455,827 B2 | 9/2002 | Zeng |
| 6,552,315 B2 | 4/2003 | Zeng et al. |
| 6,677,563 B2 | 1/2004 | Lai |
| 6,717,121 B2 | 4/2004 | Zeng et al. |
| 6,765,182 B2 | 7/2004 | Cole |
| 6,919,547 B2 | 7/2005 | Tsontzidis et al. |
| 7,319,213 B2 | 1/2008 | Tsontzidis et al. |
| 7,476,830 B2 | 1/2009 | Middleton et al. |
| 8,637,126 B2 | 1/2014 | Cleveland et al. |
| 8,680,448 B2 | 3/2014 | Wnek et al. |
| 8,803,049 B2 | 8/2014 | O'Hagan et al. |
| 8,803,050 B2 | 8/2014 | Lafferty et al. |
| 8,901,469 B2 | 12/2014 | Schneider et al. |
| 9,174,789 B2 | 11/2015 | Netzer et al. |
| 9,451,659 B2 | 9/2016 | Robbins |
| 9,493,287 B2 | 11/2016 | Lai et al. |
| 9,656,776 B2 | 5/2017 | Sloat et al. |
| 9,701,103 B2 | 7/2017 | Walsh et al. |
| 9,751,288 B2 | 9/2017 | Walsh |
| 2003/0085223 A1 | 5/2003 | Zeng et al. |
| 2003/0085224 A1 | 5/2003 | Tsontzidis et al. |
| 2003/0111463 A1 | 6/2003 | Lai |
| 2006/0011620 A1 | 1/2006 | Tsontzidis et al. |
| 2006/0049190 A1 | 3/2006 | Middleton |
| 2007/0215611 A1 | 9/2007 | O'Hagan et al. |
| 2008/0125535 A1* | 5/2008 | Wang .............. C08J 3/226 524/445 |
| 2009/0223951 A1 | 9/2009 | Lai et al. |
| 2009/0294439 A1 | 12/2009 | Lai et al. |
| 2009/0314772 A1 | 12/2009 | Parysek |
| 2014/0099455 A1 | 4/2014 | Stanley et al. |
| 2017/0260416 A1* | 9/2017 | Joyce ................ D21H 25/06 |
| 2020/0086610 A1 | 3/2020 | Bronini et al. |
| 2020/0362137 A1 | 11/2020 | Nosker et al. |
| 2021/0122543 A1* | 4/2021 | Heo .................. B32B 7/12 |

FOREIGN PATENT DOCUMENTS

| | | |
|---|---|---|
| JP | 3-505020 | 10/1991 |
| JP | 2005-211090 | 8/1993 |
| JP | 10-72068 | 3/1998 |
| JP | 2000-018595 | 1/2000 |
| JP | 2001-278362 | 10/2001 |
| JP | 2005-512902 | 5/2005 |
| KR | 10-0840926 B1 | 6/2008 |
| KR | 10-2008-0091396 A | 10/2008 |
| WO | WO 89/11772 | 11/1989 |
| WO | WO 91/11893 | 8/1991 |
| WO | WO 98/33724 | 8/1998 |
| WO | WO 98/35887 | 8/1998 |
| WO | WO 99/20116 A2 | 4/1999 |
| WO | WO 01/22778 | 3/2001 |
| WO | WO 03/041451 | 5/2003 |
| WO | WO 03/053106 | 6/2003 |
| WO | WO 2004/020310 | 3/2004 |
| WO | WO 2006/110685 | 10/2006 |
| WO | WO 2007/106353 | 9/2007 |
| WO | WO 2007/113545 | 10/2007 |
| WO | WO 2008/091760 | 7/2008 |
| WO | WO 2009/105398 | 8/2009 |
| WO | WO 2010/006098 | 1/2010 |
| WO | WO 2010/127214 | 11/2010 |
| WO | WO 2011/066254 | 6/2011 |
| WO | WO 2016/207826 A2 | 12/2016 |
| WO | WO 2021/095022 A1 | 5/2021 |

OTHER PUBLICATIONS

Khanam, P. N., AlMaadeed, M. A., Ouederni, M., Harkin-Jones, E., Mayoral, B., Hamilton, A., & Sun, D. (2016). Melt processing and properties of linear low density polyethylene-graphene nanoplatelet composites. *Vacuum*, 130, 63-71.

Maniadi, A., Vamvakaki, M., Suchea, M., Tudose, I. V., Popescu, M., Romanitan, C., ... & Koudoumas, E. (2020). Effect of graphene nanoplatelets on the structure, the morphology, and the dielectric behavior of low-density polyethylene nanocomposites. *Materials*, 13(21), 4776.

Gao, Y., Picot, O. T., Bilotti, E., & Peijs, T. (2017). Influence of filler size on the properties of poly (lactic acid)(PLA)/graphene nanoplatelet (GNP) nanocomposites. European Polymer Journal, 86, 117-131.

Fatima, Sabeen & Irfan, Syed & Iqbal, Muhammad Zafar & Rizwan, Syed. (2017). The high photocatalytic activity and reduced band gap energy of La and Mn co-doped BiFeO3/graphene nanoplatelet (GNP) nanohybrids. *RSC Advances*. 7. 35928-35937. 10.1039/C7RA04281G.

International Search Report and Written Opinion for PCT/US2022/052328 dated Apr. 19, 2023.

Gaska, K. et al., Gas Barrier, Thermal, Mechanical and Rheological Properties of Highly Aligned Graphene-LDPE Nanocomposites,

(56) References Cited

OTHER PUBLICATIONS

Polymers, 2017, 9 (7), 294. https://www.mdpi.com/2073-4360/9/7/294.

Gaska, K. et al., Electrical, Mechanical, and Thermal Properties of LDPE Graphene Nanoplatelets Composites Produced by Means of Melt Extrusion Process, Polymers, 2017, 9(1), 11. https://www.mdpi.com/2073-4360/9/1/11.

Al-Jabareen et al., Improving the Oxygen Barrier Properties of Polyethylene Terephthalate by Graphite Nanoplatelets, Journal of Applied Polymer Science, 2013, 128(3), 1534-1539.

Cui, Y. et al., Gas Barrier Performance of Graphene/Polymer Nanocomposites. Carbon, 2016, 98, 313-333.

* cited by examiner

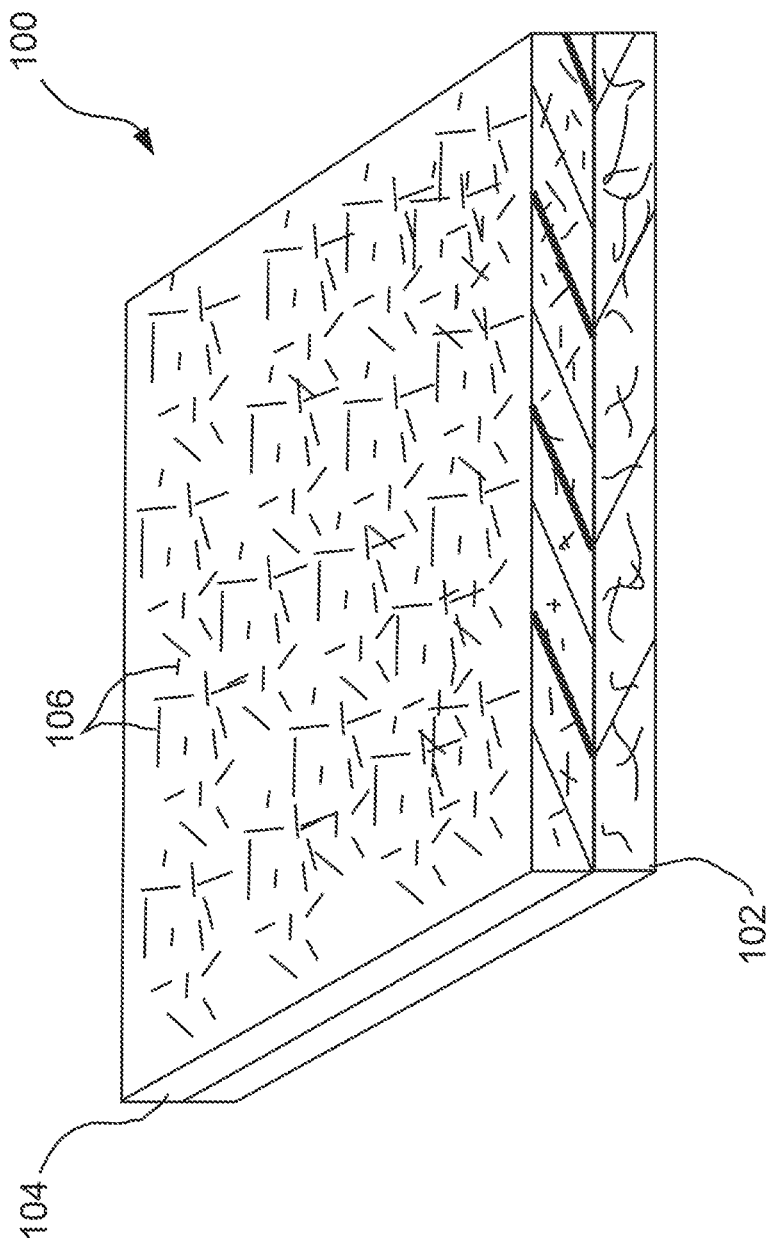

PACKAGING MATERIAL

CROSS-REFERENCED TO RELATED APPLICATIONS

This application claims the benefit of U.S. Provisional Patent Application No. 63/288,218, filed on Dec. 10, 2021.

INCORPORATION BY REFERENCE

The disclosure of U.S. Provisional Patent Application No. 63/288,218, which was filed on Dec. 10, 2021, is hereby incorporated by reference for all purposes as if presented herein in its entirety.

BACKGROUND OF THE DISCLOSURE

The present disclosure generally relates to materials (e.g., laminates) for forming packaging constructs.

BRIEF SUMMARY OF SOME ASPECTS OF THE DISCLOSURE

In one aspect, the disclosure is generally directed to a packaging material comprising a substrate and a liner extending along the substrate. The liner comprises at least a biopolymer and graphene nanoplatelets to provide a gas barrier along at least a portion of the packaging material.

In another aspect, the disclosure is generally directed to a method of forming a packaging material. The method can comprise forming a liner material by incorporating graphene nanoplatelets into a biopolymer. The method further can comprise applying the liner material to a substrate so that the liner material provides a gas barrier along at least a portion of the packaging material.

In another aspect, the disclosure is generally directed to a construct comprising a packaging material. The packaging material can comprise a substrate and a liner extending along the substrate. The liner can comprise at least a biopolymer and graphene nanoplatelets to provide a gas barrier along at least a portion of the packaging material.

Other aspects, features, and details of the present disclosure can be more completely understood by reference to the following detailed description of exemplary embodiment taken in conjunction with the drawings and from the appended claims.

BRIEF DESCRIPTION OF THE DRAWINGS

Those skilled in the art will appreciate the above stated advantages and other advantages and benefits of various additional embodiments reading the following detailed description of the exemplary embodiments with reference to the below-listed drawing figures. Further, the various features of the drawings discussed below are not necessarily drawn to scale. Dimensions of various features and elements in the drawings may be expanded or reduced to more clearly illustrate the exemplary embodiments of the disclosure.

FIG. 1 is a view of a portion of an exemplary packaging material according to the present disclosure.

Corresponding parts are designated by corresponding reference numbers throughout the drawings.

DETAILED DESCRIPTION OF EXEMPLARY EMBODIMENTS

The present disclosure generally relates to a packaging material comprising a laminate. The packaging material can be for forming a construct (e.g., a container, package, sleeve, tray, cup, insulated cup, or other constructs). In some embodiments, a packaging material can include other materials in addition to the laminate (e.g., injection-molded polymer elements). The construct, for example, can be used for holding, storing, freezing, heating, cooking, etc. food products or other products. In one example, a construct can be configured for holding a food product while heating in a microwave oven, a conventional oven, or both (e.g., dual oven heating), for hermetic sealing (e.g., extended life modified atmosphere packaging, vacuum sealed packaging, etc.), for refrigeration/freezing storage, and/or for serving foods (e.g., French fries). Additionally, the packaging material and/or a construct made from the packaging material can include microwave packaging elements (e.g., microwave energy interactive elements, such as a microwave susceptor element, a microwave shield element, etc.) and/or seals configured to automatically vent during heating or transportation at high altitude. Other uses and styles of composite constructs are also included in the present disclosure.

In the present embodiment, the materials of the elements of the packaging material can include renewable materials, natural fibers, repulpable materials, and/or degradable materials. For example, renewable materials could be at least partially derived from biological processes or other processes wherein the supply can be replenished in a reasonable time period, which can include annually-renewable plant sources, plant sources that can be renewed in years or decades, algae, bacteria, or any other suitable source. In one example, a reasonable time period for at least partially replenishing a resource can be within an average person's lifetime. A polymer that is derived solely from fossil-based petrochemicals might not be considered a bio-derived polymer, for example; however, some substances that are similar to petrochemicals (e.g., petrochemical analogues) can be produced at least partially by microbes and/or other biological sources or by chemically reacting or modifying bio-sourced materials, for example, and these at least partially bio-derived petrochemical analogues can be used to produce at least partially bio-derived polymers. A natural fiber can be any at least partially naturally-occurring fiber, such as those derived from plants (e.g., wood fibers, cotton, hemp, jute, flax, coir, bamboo, sugarcane, rice husks, banana fiber, ramie, sisal, and other plants). A repulpable material (e.g., paper products) can be a material that can be returned to a pulp (e.g., by chemical, mechanical, and/or other suitable methods) for making a new material from the pulp (e.g., recycled paper). A degradable material (e.g., polylactide-based polymers) could be an at least partially compostable, biodegradable material, and/or other materials that can at least partially break down into small parts that are relatively harmless to the environment and/or into nutrients (e.g., for beneficial plants and/or bacteria) in a reasonable amount of time.

According to one embodiment, renewable and/or degradable materials can include at least partially bio-based polymers ("biopolymers"), polymers that are at least partially formed from chemicals that are output by or extracted from biological organisms (e.g., plants, algae, bacteria, animals), paper products, and/or other materials. Paperboard and other paper products are often recognized as inherently sustainable or renewable materials as the trees and other plants that provide raw materials for the paper products can be and are routinely replanted in a sustainably renewable fashion. In one embodiment, the renewable and/or degradable material can be processed in injection molding applications, can be bonded or otherwise applied to a substrate (e.g., a blank or a pressed tray), has sealing, barrier, and/or venting properties, and/or has temperature resistance for heating (e.g., microwave and/or conventional oven) and/or for refrigeration/freezing or other storage. Other renewable and/or degradable materials can also be used without departing from the present disclosure.

The materials of the packaging material can have suitable properties for the particular type of construct made from the packaging material. For example, a construct that is a tray or other container for holding or serving a food product can comprise a barrier layer that is permeable or impermeable to certain gases, liquids, and/or other flowable materials (e.g., oils, oxygen, water, etc.). A construct for heating a food product can comprise renewable materials with a temperature resistance of at least about 165 degrees Fahrenheit since it is often recommended to heat many food products to at least this temperature. Applications with lower temperature resistance requirements can include, for example, non-food heating, heating beverages, reheating some food items, applications that only require storage and/or cooling, and/or other suitable applications. Some applications can have higher temperature resistance requirements, such as for food products that require a higher external temperature in order to reach a minimum internal temperature, and/or for heating food products at least partially in a conventional oven, which can be set at higher temperatures for heating a food product via conduction and/or convection. Other considerations for selecting a suitable material can include material strength for supporting the weight of a product and/or for stacking.

In the present embodiment, the packaging material can comprise a laminate 100 as shown in FIG. 1. The laminate can include a substrate 102 and a film, coating, or liner 104 that is applied (e.g., adhered, heat sealed, and/or otherwise attached) to the substrate 102. The substrate 102 can be a paper product (e.g., paper, paperboard, cardboard, and/or other suitable fibrous and/or non-fibrous materials), other suitable materials that are renewable, degradable, compostable, and/or repulpable, and/or any other suitable material. In one embodiment, the liner 104 can include a biopolymer or bioplastic, such as those in the subset known as Polyhydroxyalkanoates (PHA), in combination with graphene nanoplatelets 106. In exemplary embodiments, graphene nanoplatelets can be a form of graphene. Graphene is an ultrathin form of carbon in which atoms are arranged in a flat two-dimensional lattice. In exemplary embodiments, graphene can have exceptionally outstanding electrical, mechanical, and/or thermal properties, and graphene is being explored for a wide array of applications. Graphene nanoplatelets (GNPs) are short stacks of graphene having a platelet shape and that are available in different grades. For example, the short stacks can include layers of graphene stacked to a height that is less than the length and/or width of the layers.

In embodiments, the laminate 100 can provide a sustainable functional biopolymer nanocomposite material from renewable resources with a gas and/or water barrier for packaging. In alternative embodiments, the polyhydroxyalkanoates (PHA) could be replaced by other biomaterials, such as Polylactic acid (PLA) and/or Polybutylene succinate (PBS).

In embodiments, the liner 104 can be formed by incorporating graphene nanoplatelets into polyhydroxyalkanoates. The polyhydroxyalkanoates with the graphene nanoplatelets can provide barrier properties against water and/or gas (e.g., oxygen, carbon dioxide, nitrogen, etc.). In an exemplary embodiment, the liner material can be formed by melt compounding graphene nanoplatelets with a biopolymer (e.g., polyhydroxyalkanoates) and/or by other suitable processes. The liner material can then be applied to the substrate 102 (e.g., by flexo/gravure processes, flood coating, extrusion coating, and/or other suitable processes) to form the laminate 100 so that the liner 104 creates a gas and/or water barrier on the substrate. In embodiments, the graphene nanoplatelets can be prepared in aqueous solutions, and dispersing agents (e.g., graphene oxide, ethanol, isopropyl alcohol, calcium stearate, etc.), electrostatic systems, etc. can be used to help reduce or prevent agglomeration of the graphene nanoplatelets. The coating can be formed on the substrate by applying the aqueous solution to the substrate in a drawdown process, for example.

In exemplary embodiments, the polyhydroxyalkanoates or other biopolymers and the graphene nanoplatelets can be combined in suitable amounts so that the graphene nanoplatelets are randomly dispersed in the material and agglomeration of the graphene nanoparticles is avoided. In embodiments, factors such as the polymer used, the method of combining the polymer and the graphene nanoplatelets, the amount of graphene nanoplatelets incorporated into the polymer, and/or other factors can affect the amount of agglomeration of the graphene nanoparticles in the coating. For example, certain composites can show improved material properties (e.g., with low agglomeration of graphene nanoparticles) at loadings of about 4 weight % or about 5 weight % (e.g., for LLDPE or PLA), wherein increased mixing (e.g., higher screw speeds) can decrease agglomeration and increase material properties (e.g., tensile strength) at these loadings, while higher loadings (e.g., at about 10 weight %) may result in more agglomeration that is more difficult to overcome with mixing speeds. In examples, the amount of graphene nanoparticles included in the coating of the present application can be about 10 weight % or less, about 9 weight % or less, about 8 weigh % or less, about 7 weigh % or less, about 6 weigh % or less, about 5 weigh % or less, about 4 weigh % or less, about 3 weigh % or less, about 2 weigh % or less, about 1 weigh % or less, about 0.5 weigh % or less, or other suitable amounts. In additional examples, the amount of graphene nanoparticles included in the coating can be about 1 weight % to about 10 weight %, about 2 weight % to about 10 weight %, about 3 weight % to about 10 weight %, about 4 weight % to about 10 weight %, about 5 weight % to about 10 weight %, about 6 weight % to about 10 weight %, about 7 weight % to about 10 weight %, about 8 weight % to about 10 weight %, about 9 weight % to about 10 weight %, about 1 weight % to about 7 weight %, about 2 weight % to about 7 weight %, about 3 weight % to about 7 weight %, about 3 weight % to about 7 weight %, about 4 weight % to about 7 weight %, about 5 weight % to about 7 weight %, about 6 weight % to about 7 weight %, about 1 weight % to about 5 weight %, about 2 weight % to about 5 weight %, about 3 weight % to about 5 weight %, about 4 weight % to about 5 weight %, about 1 weight % to about 4 weight %, about 2 weight % to about 4 weight %, about 3 weight % to about 4 weight %, about 1 weight % to about 3 weight %, about 2 weight % to about 3 weight %, about 1 weight % to about 2 weight %, or other suitable amounts.

In embodiments, polyhydroxyalkanoates are sourced from renewable resources, including through the bacterial fermentation of sugar and lipids. Compounding materials such as this with graphene nanoplatelets can create a gas barrier, such as an oxygen and/or carbon dioxide barrier, which can help preserve and maintain the quality of food products and other articles. In exemplary embodiments, the graphene nanoplatelets can improve the gas barrier properties of the biopolymer (e.g., polyhydroxyalkanoates) by a mechanism related to factors including the presence of dispersed graphene nanoplatelets in the polymer can increase the path for the diffusing molecules through the coating and a higher degree of crystallinity can be nucleated by the graphene nanoplatelets in the polymer. In exemplary embodiments, the improved barrier properties due to graphene nanoplatelets are accompanied by a higher dimensional stability, which can be linked to the stiffening effect of the graphene nanoplatelets, and by improved thermal stability.

The packaging material having a substrate such as paperboard and a liner including graphene nanoplatelets incorporated in a biopolymer such as polyhydroxyalkanoates can have many advantages over other materials. For example, the packaging material of the present disclosure can be sourced from more easily renewable materials and/or can be more degradable, compostable, and/or recyclable than other packaging materials with gas and/or moisture barriers. In embodiments, the biopolymer and graphene nanoplatelet composite can provide barriers that can replace non-sustainable barriers, can improve heat management (e.g., through heat sealability, insulation, anisotropic thermo-conductive properties, etc.), and/or can have microwave applications (e.g., graphene nanoplatelets can cause changes in dielectric properties). In exemplary embodiments, polyhydroxyalkanoates can be significantly more biodegradable compared to other barrier polymers such as ethylene-vinyl alcohol copolymer (EVOH), polyvinylidenedichloride (PVDC), and Nylon, for example. In embodiments, graphene nanoplatelets can provide coatings with flexural strength and/or heat sealability and/or can be used in film barriers and/or microwave heating applications.

In embodiments related to microwave applications, a liner with graphene nanoplatelets can have thermo-conductive properties that are anisotropic (e.g., strongly anisotropic) and can have higher conduction in the plane of the graphene nanoplatelets and lower conduction in a direction that is perpendicular to the plane of the graphene nanoplatelets. In addition, graphene agglomerates can cause different dielectric properties in nanocomposites. In embodiments, graphene coated paperboard can have similar or identical reflectance, absorbance, and transmission as standard clay coated solid bleached sulfate (SBS) paperboard.

According to one embodiment, the packaging material includes multiple layers, each comprising materials that are derived from up to 100 percent renewable sources and/or degradable materials. Accordingly, the composite constructs can have little or no strain on non-renewable resources and the use of renewable and/or degradable materials can be advertised to a consumer. Additionally, the present disclosure is directed to using renewable and/or degradable materials in a construct with the advantages of a laminate, including those that use paper or paperboard for enhanced package graphics and stiffness at elevated cooking temperatures, with a barrier layer for reducing permeability to certain substances with the added benefits of being suitable for alternative waste streams (e.g., composting, recycling, etc.).

In accordance with the exemplary embodiments, the packaging material can be formed into blanks for forming respective constructs (e.g., trays, cartons, fast food containers, cups, insulated cups, etc.). The substrate can be formed from paperboard, corrugated cardboard or other materials having properties suitable for at least generally enabling respective functionalities described above. Paperboard can be of a caliper such that it is heavier and more rigid than ordinary paper, and corrugated cardboard can be of a caliper such that it is heavier and more rigid than paperboard. Generally, at least the side of the paperboard or cardboard that will be an exterior surface in the carton erected therefrom will be coated with a clay coating, or the like. The clay coating can be printed over with product, advertising, price-coding, and other information or images. The blanks may then be coated with a varnish to protect any information printed on the blanks. The blanks may also be coated with, for example, a moisture barrier layer, on one or both sides. The blanks can also be laminated to or coated with one or more sheet-like materials.

The foregoing description illustrates and describes various embodiments of the disclosure. As various changes could be made in the above construction, it is intended that all matter contained in the above description or shown in the accompanying drawings shall be interpreted as illustrative and not in a limiting sense. Furthermore, various modifications, combinations, and alterations, etc., of the above-described embodiments are within the scope of the disclosure. Additionally, the disclosure shows and describes only selected embodiments, but various other combinations, modifications, and environments are within the scope of the disclosure, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A packaging material, comprising:
   a substrate; and
   a liner extending along the substrate, the liner comprises at least a biopolymer and graphene nanoplatelets to provide a gas barrier along at least a portion of the packaging material, wherein the graphene nanoplatelets are randomly dispersed in the biopolymer so that agglomeration of the nanoplatelets is avoided.

2. The packaging material of claim 1, wherein the biopolymer comprises a polyhydroxyalkanoate.

3. The packaging material of claim 2, wherein the liner comprises less than about 5 weight % of the graphene nanoplatelets.

4. The packaging material of claim 2, wherein the substrate comprises a paper product.

5. The packaging material of claim 1, wherein the biopolymer is sourced from renewable resources and is biodegradable.

6. The packaging material of claim 5, wherein the substrate comprises a material that is at least one of renewable, degradable, compostable, and repulpable.

7. The packaging material of claim 1, wherein less than about 5 weight % of the graphene nanoplatelets are incorporated into the biopolymer.

8. A construct comprising a packaging material, the packaging material comprising:
   a substrate; and
   a liner extending along the substrate, the liner comprises at least a biopolymer and graphene nanoplatelets to provide a gas barrier along at least a portion of the packaging material, wherein the graphene nanoplatelets are randomly dispersed in the biopolymer so that agglomeration of the nanoplatelets is avoided.

9. The construct of claim 8, wherein the biopolymer comprises a polyhydroxyalkanoate.

10. The construct of claim 9, wherein the liner comprises less than about 5 weight % of the graphene nanoplatelets.

11. The construct of claim 9, wherein the substrate comprises a paper product.

12. The construct of claim 8, wherein the biopolymer is sourced from renewable resources and is biodegradable.

13. The construct of claim 12, wherein the substrate comprises a material that is at least one of renewable, degradable, compostable, and repulpable.

14. The construct of claim 8, wherein less than about 5 weight % of the graphene nanoplatelets are incorporated into the biopolymer.

* * * * *